(12) United States Patent
Chapagain et al.

(10) Patent No.: US 10,443,729 B2
(45) Date of Patent: Oct. 15, 2019

(54) SEAL FOR A JOINT ASSEMBLY

(71) Applicant: Caterpillar Inc., Peoria, IL (US)

(72) Inventors: Pradeep Chapagain, Peoria Heights, IL (US); Sunil I. Mathew, Peoria, IL (US); Charles Taylor Hudson, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 1126 days.

(21) Appl. No.: 14/673,209

(22) Filed: Mar. 30, 2015

(65) Prior Publication Data

US 2016/0290507 A1  Oct. 6, 2016

(51) Int. Cl.
| F16J 15/16 | (2006.01) |
|---|---|
| F16J 15/20 | (2006.01) |
| F16J 15/50 | (2006.01) |
| F16J 15/06 | (2006.01) |
| F16C 11/04 | (2006.01) |
| F16J 15/34 | (2006.01) |

(52) U.S. Cl.
CPC .............. *F16J 15/06* (2013.01); *F16C 11/04* (2013.01); *F16J 15/3456* (2013.01); *F16J 15/50* (2013.01)

(58) Field of Classification Search
None
See application file for complete search history.

(56) References Cited

U.S. PATENT DOCUMENTS

| 2,576,721 | A | 11/1951 | Edward |
| 3,292,957 | A | 12/1966 | Ulderup |
| 3,294,409 | A | 12/1966 | Burtis |
| 3,909,076 | A * | 9/1975 | Kato ............... B62D 55/0887 277/363 |
| 3,975,028 | A | 8/1976 | Satsumabayashi |
| 4,043,564 | A | 8/1977 | White |
| 4,364,572 | A | 12/1982 | Yamamoto et al. |
| 5,374,115 | A * | 12/1994 | Ketting ............. B62D 55/0887 305/103 |
| 6,951,373 | B2 * | 10/2005 | Akita ................. B62D 55/0887 277/628 |
| 8,651,497 | B2 | 2/2014 | Tholen et al. |
| 9,327,783 | B1 * | 5/2016 | Mulligan .............. B62D 55/15 |
| 2012/0119567 | A1 * | 5/2012 | Johannsen ......... B62D 55/0887 305/103 |

FOREIGN PATENT DOCUMENTS

| EP | 1375316 | 1/2004 |
| EP | 1669647 | 6/2006 |
| FR | 2216868 | 8/1974 |
| FR | 2985220 | 7/2013 |

* cited by examiner

*Primary Examiner* — Matthieu F Setliff
*Assistant Examiner* — Douglas S Wood
(74) *Attorney, Agent, or Firm* — Leydig, Voit & Mayer, Ltd.

(57) ABSTRACT

A spring seal for a joint assembly pivotally joining a lever arm to a machine frame includes an annular body having a W-shaped cross section. The W-shaped cross section includes a first cantilevered arm, a parallel and spaced apart second cantilevered arm, and a spring leg joining the first and second cantilevered arms. The spring seal is disposed between a bearing surface on the lever arm and a lug on the frame. The W-shaped cross section of the spring seal can collapse and relax to accommodate movement between the lever arm and the frame lug. A second spring seal can be disposed between a second bearing surface on the lever arm and a second frame lug opposite the first lug.

20 Claims, 7 Drawing Sheets

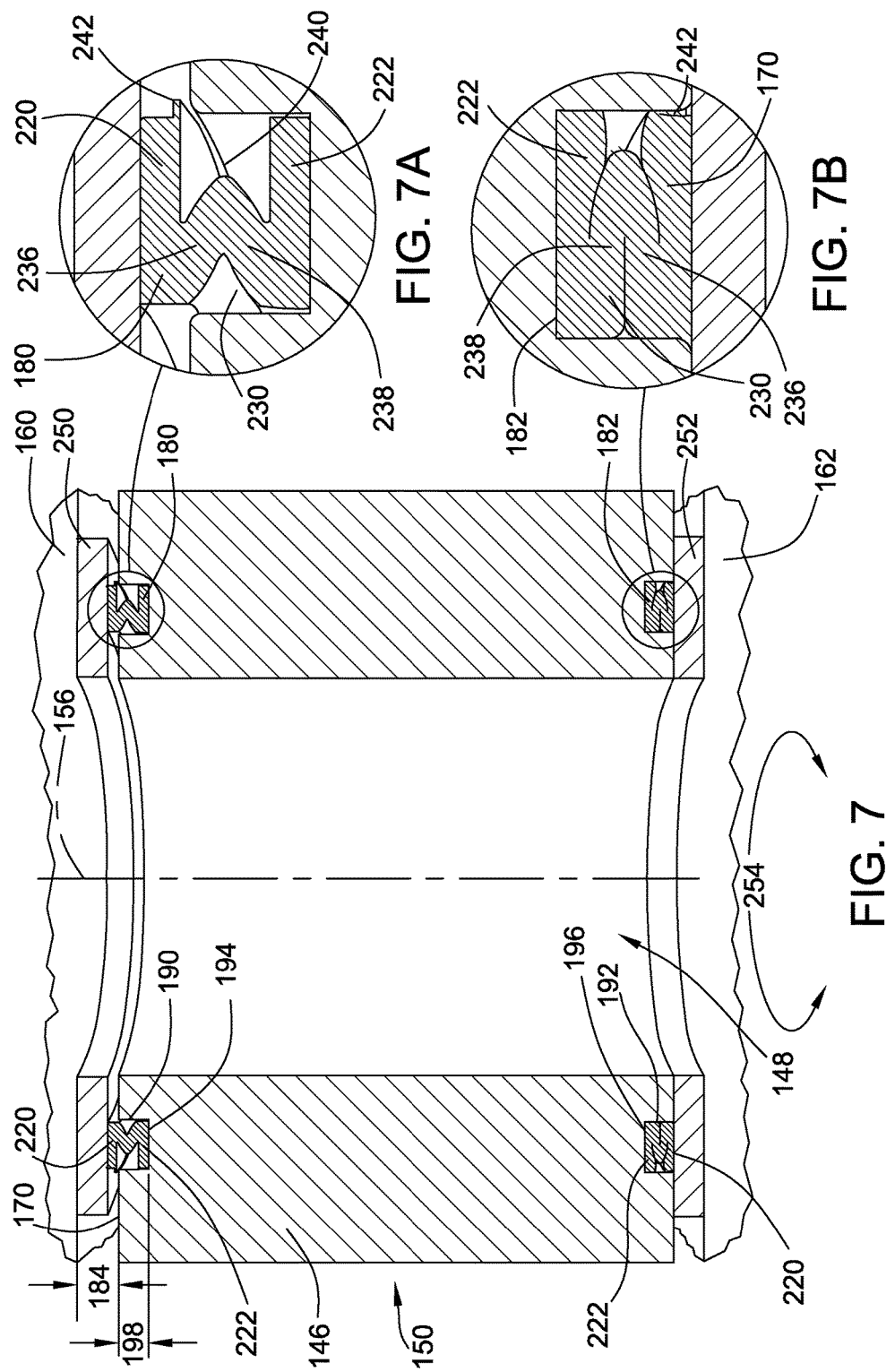

US 10,443,729 B2

SEAL FOR A JOINT ASSEMBLY

TECHNICAL FIELD

This patent disclosure relates generally to a compressible seal for sealing a mechanical joint of a machine, and more particularly, to a dry spring seal assembly adapted to form a seal between two pivoting members without the need for reoccurring lubrication of the joint.

BACKGROUND

Machines often include moving joints where parts or members of the machine are configured to move or articulate with respect to each other. One example may be the steering and suspension system for an off-highway machine or vehicle that enables the wheels to move with respect to the frame to propel and/or steer the machine. For example, to steer the machine, the steering system in one common configuration may include a component called a pitman arm which resembles a lever that is pivotally attached at one end to the steering box in which the steering column operatively associated with the steering wheel terminates. The opposite end of the pitman arm is connected through linkages to the steering arms that are typically associated with the front wheels of the machine. When the operator turns the steering wheel to change the course of the machine, the pitman arm pivots towards one side of the machine or the other side causing the wheels to turn or tilt with respect to the frame.

To prevent the interconnected parts of the steering system that move with respect to each other from wearing due to friction against each other or due to dirt and/or contaminants that may enter the joint, it is known to apply a lubricant such as grease to the joints. However, lubricants may eventually break down or be expelled from the joint due to motion between the members. Accordingly, the joints of the machine may require replenishment of the lubricant, such as is done through re-greasing the parts. This results in maintenance downtime for the machine and incurs productivity losses and the like.

In addition to or as an alternative to using lubricants, seals can be used to protect the joints. In some instances, the seal may prevent the lubricant from being expelled from the joint and in other instances may facilitate relative motion of the parts. One example of a seal is disclosed in U.S. Pat. No. 4,364,572 ("the '572 patent"), assigned to Kabushiki Kaisha Komatsu Seisakusho of Japan. The '572 patent describes a seal assembly that includes a seal ring having a highly curved or undulating cross-sectional shape that the '572 patent describes as generally being w-shaped and is adapted to fit around a load ring. The seal ring and load ring can be placed in a counterbore formed between two different components of a machine that are joined together. When the two components are pressed against each other, the curved cross-section of the seal ring wraps partially around and is compressed against the load ring thereby forming a seal between the components. The present application is similarly directed to a seal having a particular cross-sectional shape for sealing the moving joints of a machine.

SUMMARY

The disclosure describes, in one aspect, a joint assembly for joining a lever arm to a frame of the machine. The joint assembly includes a frame joint for attachment to the frame of the machine. The frame joint has an upper first lug defining a first aperture and a lower second lug defining a second aperture, where the first lug and the second lug are spaced apart from each other and axially aligned along a pivot axis. The joint assembly also includes a lever arm having a first end and a distal second end designating the extension of the lever arm. A sleeve joint is disposed on the first end and defines a sleeve bore transverse to the extension of the lever arm. The sleeve joint is received between the first lug and the second lug with the sleeve bore axially aligned along the pivot axis with the first and second apertures. To pivotally join the lever arm to the first and second lugs, a pin can be disposed through the first aperture, the second aperture, and the sleeve bore. To seal the parts, a first spring seal is disposed between the sleeve joint and the first lug and a second spring seal is disposed between the sleeve joint and the second lug, both arrange to circumscribe the sleeve bore. The first spring seal and the second spring seal each include an annular body having a W-shaped cross section with a first cantilevered leg, a spaced apart second cantilevered leg extending parallel to the first cantilevered leg, and a spring leg joined to and connecting the first and second cantilevered legs and adapted to maintain sealing contact with the frame join and the sleeve joint.

In another aspect, the disclosure provides a method for pivotally connecting a lever arm to a frame of a machine. The method provides a frame joint attached to a frame that includes a first lug defining a first aperture and a second lug defining a second aperture. The first and second lugs are spaced apart from each other with the first and second apertures aligned along a pivot axis. A sleeve joint formed on the lever arm is disposed between the first lug and the second lug such that a sleeve bore disposed in the sleeve joint is aligned with the pivot axis. The method further provides a first spring seal and a second spring seal each having an annular body with a W-shaped cross-section. The first spring seal is disposed between a first bearing surface of the sleeve joint and the first lug and the second spring seal is disposed between a second bearing surface of the sleeve joint and the second lug, with both spring seals arranged to circumscribe the sleeve bore. According to the method, a first spring seal is compressed by axially moving the sleeve joint toward the first lug while the second spring seal is relaxed to still maintain sealing contact between the second bearing face and the second lug.

In yet another aspect, the disclosure provides a spring seal for sealing between a planar frame face of a first body and a groove disposed on a second body. The spring seal includes an annular body circumscribing a center axis and having a W-shaped cross-section formed by a first cantilevered leg, a spaced apart second cantilevered leg extending parallel to the first cantilevered leg, and a spring leg connecting the first and second cantilevered legs. A first annular sealing surface is provided on the first cantilevered leg for making sliding contact with the planar face. Likewise, a second annular sealing surface is arranged on the second spring leg for making sealing contact with a groove bottom of the groove. Further, the annular body has an uncompressed height between the first annular sealing surface and the second annular sealing surface adapted to be greater than a depth of the groove.

BRIEF DESCRIPTION OF THE DRAWINGS

FIG. 7 is a schematic representation of the cross section of the joint assembly of FIG. 4 with the pin removed.

FIG. 7A is a detailed view of the spring seal in a relaxed state when under minimum contact pressure.

FIG. 7B is a detailed view of the spring seal in a compressed state when under maximum contact pressure.

DETAILED DESCRIPTION

Figure 1:
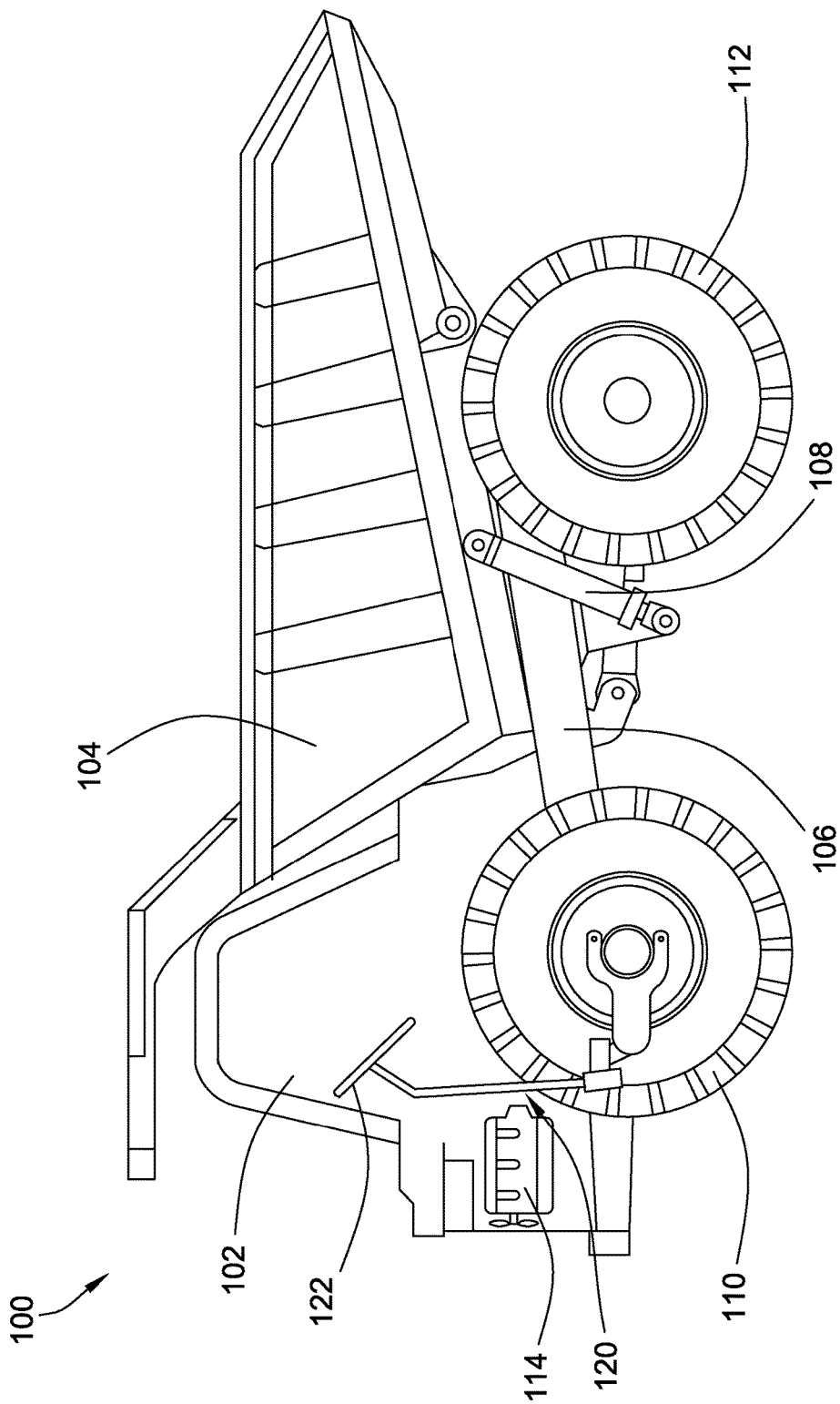
FIG. 1 is a side elevational view of an exemplary machine in the form of an off-highway dump truck including one or more moving joints in the steering system that may utilize a sealed joint assembly designed in accordance with the disclosure.

This disclosure relates to seal assemblies and methods for sealing joints between moving parts or components on machines such as work machines for performing an operation or a task. Referring to the FIGS., wherein like reference numbers refer to like elements, an example of such a machine 100 is illustrated in FIG. 1 that can utilize the seal assemblies according to the present disclosure. While the particular machine 100 is an off-highway dump truck for hauling and dispensing material about a worksite, it should be appreciated that as used herein, the term "machine" may refer to any machine that performs some type of operation associated with an industry such as mining, construction, farming, transportation, or any other industry known in the art. For example, the machine may be an earth-moving machine, such as a wheel loader, excavator, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

To facilitate operation of the illustrated embodiment in hauling materials in, for example, a mining operation, the machine 100 can include a forwardly located operator's cab 102 for the operator of the machine and a rearwardly located dump body 104 for accommodating materials such as soil or earth. Both the operator's cab 102 and the dump body 104 can be supported on a chassis or frame 106 of the machine. The frame 106 can be made of strong, rigid materials such as metal trusses or the like for sufficient strength for its hauling and load bearing functions. The operator's cab 102 can accommodate various controls, interfaces, and readouts that are used for operating the machine. For holding the material, the dump body 104 can be a walled structure defining a volume in which the material is contained. To dispense the material when desired, the dump body 104 can be tilted upwardly with respect to the frame 106 from the normal horizontal position to an articulated position by hydraulic cylinders 108 or the like so that material dispenses from the rear.

To propel the machine 100 about the worksite with respect to the ground, the frame 106 can be supported on a plurality of wheels including a pair of forward wheels 110 and a pair of rearward wheels 112 that contact and are able to rotate across the ground. However, in other embodiments, different propulsion mechanisms for machines rather than wheels may be used. In addition, the wheels may be fitted with inflatable tires to enhance performance or, in other embodiments, may be solid. The rear wheels 112 can be the drive wheels that receive motive power to drive the machine 100 from a power source 114 such as an internal combustion engine, although in other embodiments other power sources can include hybrid engines, electric engines, and the like. The rear wheels 112 can be operatively associated with the power source 114 through a suitable power train for powered rotation over the ground. To direct or change the course of travel of the machine 100, the front wheels 110 can be the steer wheels that are able to turn or tilt toward one side of the machine or toward the other side. To enable the operator to steer the front wheels 110, the machine includes a steering system 120 or steering mechanism. The steering system 120 can include a control device like a steering wheel 122 or a similar operator interface located in the operator's cab 102 operatively associated with the front wheels 110 as explained below. In addition to the ability to steer the machine, in various embodiments, the front wheels 110 may also be driven wheels such as in a four-wheel drive configuration.

Figure 2:
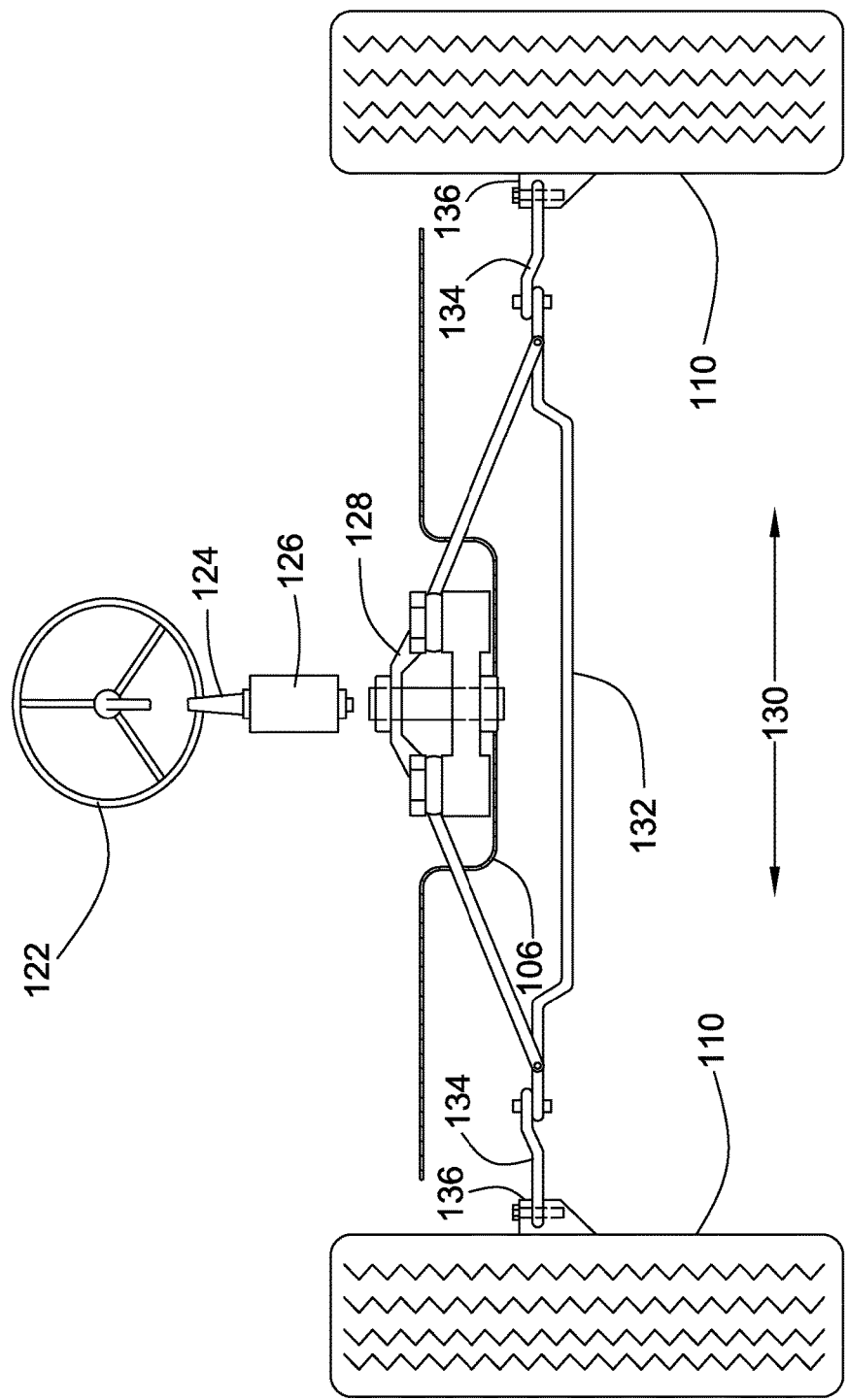
FIG. 2 is a schematic representation of an example of the steering system for directing the course of travel of the machine of FIG. 1 that includes one or more moving joints, pivots, and linkages for turning the wheels of the machine.

Referring to FIG. 2, there is illustrated a schematic diagram of an example of the steering system 120 for mechanically linking the steering wheel 122 to the front wheels 110. It should be noted that the illustrated embodiment is highly schematic in nature and a representative example of a steering system only and that any number of different designs or variations of a steering system can be suitably utilized with the present disclosure. In the illustrated embodiment, the steering wheel 122 is connected to a steering column 124 that depends from the operator's cab 102 and that can be supported by brackets or braces with respect to the frame 106. The depending steering column 124 can terminate in a component referred to as the steering box 126. As will be familiar to those of skill in the art, the steering box 126 is a mechanical component in part responsible for converting the rotational input from the steering wheel 122 and steering column 124 into a laterally horizontal motion used to turn the tires with respect to the frame 106 of the machine. The steering box 126 may be fixed to the frame 106 by any suitable means and may include a lever arm 128 projecting from the box that can swivel or pivot side-to-side with respect to the frame as indicated by the arrow 130. The lever arm 128 may be referred to as a pitman arm and will be described in further detail herein.

To link the lever arm 128 or pitman arm to the front wheels 110 in a manner that enables the wheels to turn, the steering system 120 can include additional linkage components such as rods, pivots, ball joints, and the like. For example, the steering system 120 may include a centrally disposed track rod 132 that connects to the lever arm 128 and that may be generally displaced in a side-to-side motion along the direction of the arrow 130. As will be familiar to those of skill in the art, movable idler arms can support the track rod 132 in a laterally movable manner with respect to the frame. Tie rods 134 can be connected toward each of the ends of the track rod 132 and can be operatively associated with each of the front wheels 110. In particular, each of the front wheels 110 can be associated with a steering arm 136 that connects to the respective tie rod 134 via a ball-and-socket joint or the like and is shaped to turn the wheels at the desired relative angles with respect to the frame 106. The steering system 120 can further be configured to adjust the steering ratio and to provide a mechanical advantage to increase the rotational work input through the steering wheel 122 that is converted into the lateral movement of the track rod 132. To perform as described, the components of the steering system are rigid bodies and can be made from metal rods, forgings, and/or castings.

Figure 3:
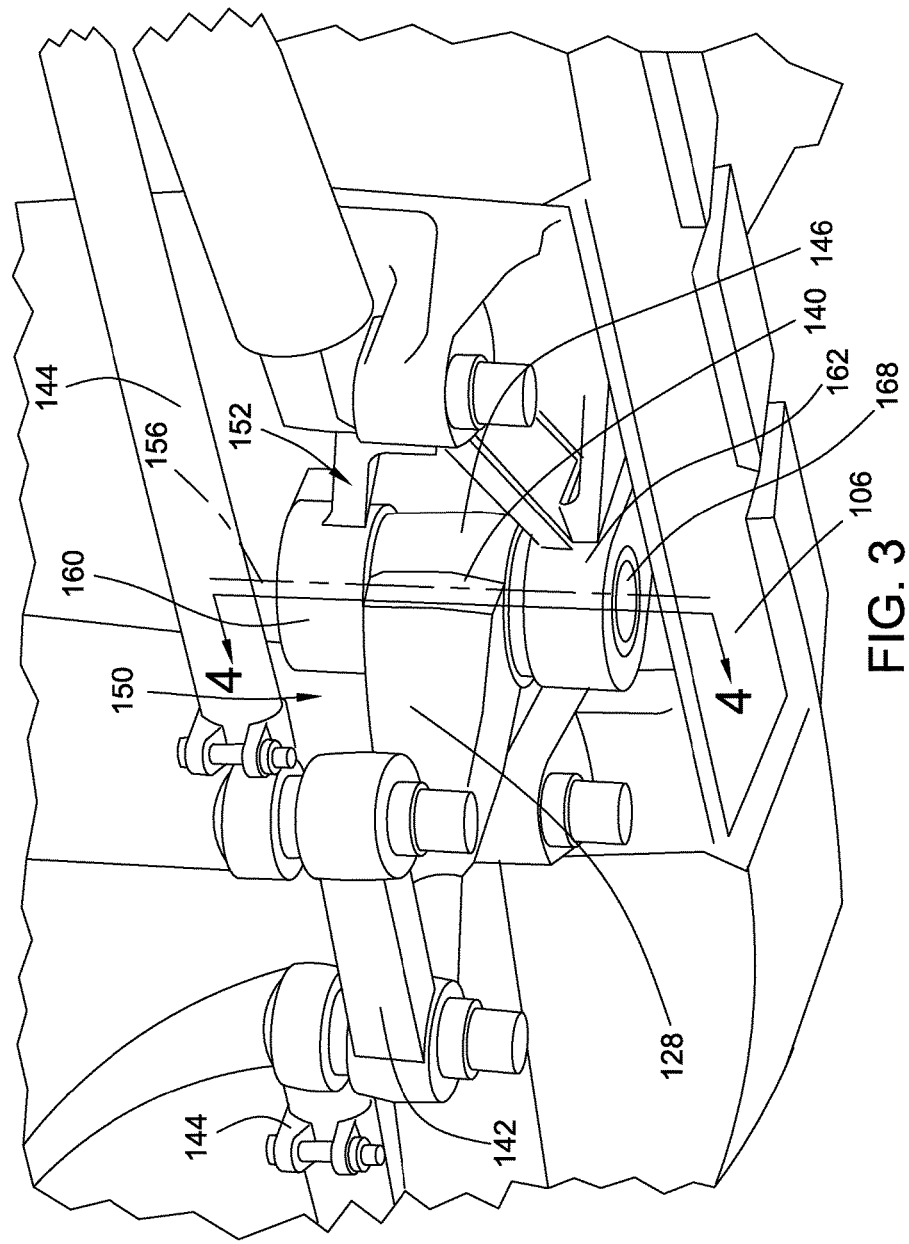
FIG. 3 is a lower perspective view of a moving joint assembly included with the steering system that has a lever arm in the form of a pitman arm pivotally joined with the frame of the machine.

Referring to FIG. 3, there is illustrated an embodiment of the lever arm 128, often referred to as a pitman arm, operatively connected to the steering system, but in other embodiments the connection configuration and/or shape of the lever arm may be different than as appears in the illustration. The lever arm 128 can be an elongated structure pivotally secured to the frame 106 at a first end 140 and operatively connected to the track rod at a distal second end 142 by one or more links 144. The lever arm can be made from a rigid, metal material for strength purposes. In the illustrated embodiment, the distal second end 142 can be bifurcated to connect to the links 144, but in other embodiments, can have a different configuration. The lever arm 128 therefore delineates a horizontal extension or length between the first end 140 and the distal second end 142. The distal second end 142 can therefore angularly swing in the lateral direction with respect to the pivot provided by the secured first end 140. To enable the lever arm 128 to pivot with respect to the frame 106, the lever arm 128 can be joined thereto by a joint assembly 150 that, in the illustrated embodiment, may be constructed as a pin joint assembly or revolute joint assembly.

Figure 4:
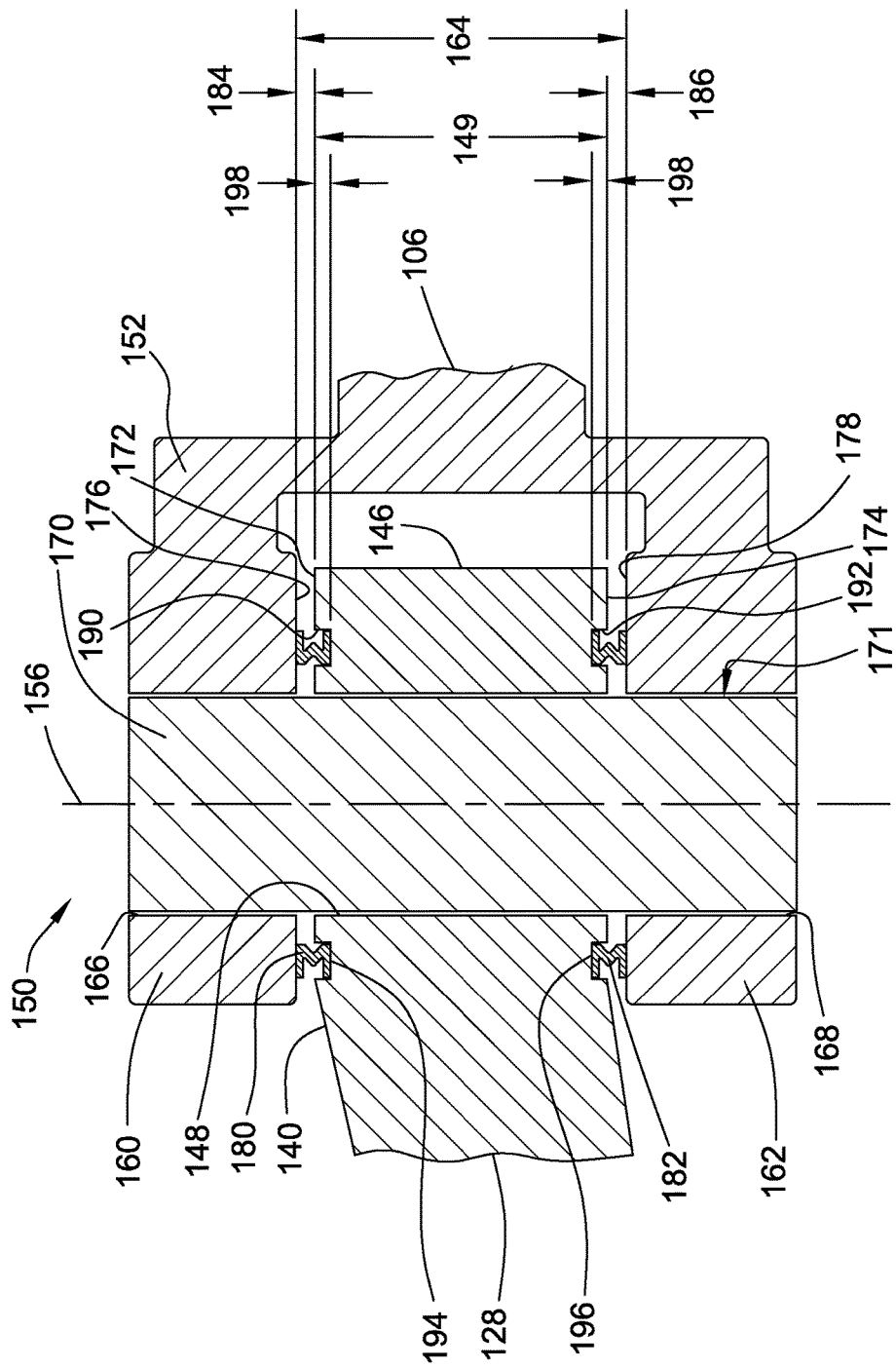
FIG. 4 is a cross-sectional view of the moving joint assembly in the form of a pivoting pin joint with a pin securing one end of the lever arm between a first lug and a second lug projecting from the frame of the machine and with a first spring seal and a second spring seal arranged to seal the joint assembly at the interfaces of the lever arm and the first and second lugs.

Referring to FIGS. 3 and 4, to form the joint assembly 150, the first end 140 of the lever arm 128 can be formed as a sleeve joint 146 that can connect to a corresponding frame joint 152 fixedly disposed on the frame 106 of the machine. The sleeve joint 146 on the lever arm 128 is formed as a sleeve or barrel with a sleeve bore 148 disposed vertically through the first end 140 and is oriented generally perpendicular to the extension of the lever arm. The sleeve bore 148 can be generally cylindrical in shape. The sleeve bore 148 can delineate a pivot axis 156 of the joint assembly 150 when joined to the frame. The sleeve joint 146 including the sleeve bore 148 can have a sleeve height 149 as indicated in FIG. 4. To connect with the sleeve joint 146, the frame joint 152 can include a first lug-shaped member, hereinafter the first lug 160, projecting from a surface of the frame 106 and a corresponding second lug-shaped member, or second lug 162, likewise projecting from the frame. The first lug 160 and the second lug 162 can have any suitable, boss-like shape but in the illustrated embodiment are generally rounded. The first lug 160 and the second lug 162 can be arranged in an opposing, spaced apart relation with the first lug oriented vertically above the second lug by a distance or lug height 164 as also indicated in FIG. 4.

To enable the frame joint 152 to pivotally connect with the sleeve joint 146, there can be a first aperture 166 vertically disposed through the first lug 160, which may be circular in shape, while an identical second aperture 168 can be disposed vertically through the second lug 162. The first aperture 166 and the second aperture 168 can be axially aligned with the pivot axis 156. To join the lever arm 128 and frame 106 via the sleeve joint 146 and the frame joint 152, a cylindrical, rod-like pin 170 can be inserted through the similarly shaped first and second apertures 166, 168 and the sleeve bore 148, thereby maintaining alignment of the apertures and sleeve bore with the pivot axis 156. The length or height of the pin 170 preferably is such that the pin can substantially protrude through the sleeve bore 148 and both the first and second apertures 166, 168. The diameter of the pin 170 forming the cylindrical exterior 171 is less that the corresponding diameter of the sleeve bore 148. The pin 170 further enables the lever arm 128 to pivot or revolve around the pivot axis providing for a single degree an angular motion. Referring back to FIG. 2, the lever arm 128 can therefore pivot to laterally move the track rod 132 in the direction indicated by arrow 130 to turn the front wheels 110 towards the sides of the machine 100.

Accordingly, it will be apparent to those of skill in the art that the joint assembly 150 is a friction-generating component with multiple parts moving relative to each other. In some embodiments, the pin 170 may be fixed to the first and second lugs 160, 162 with set screws or the like with the sleeve joint 146 rotating about the pin, while in other embodiments the pin and sleeve joint may be fixed and pivot within the first and second apertures 166, 168 disposed in the lugs. Further, in some embodiments, all the components of the joint assembly 150 may move freely with respect to each other and the pin 170 can be secured from dislodging from the assembly by cotter pins or the like. To facilitate relative motion of the parts and to prevent contamination of the joint assembly 150, a lubricant such as grease may be applied to the joint assembly and accommodated in the sleeve bore 148 and the first and second apertures 166, 168. However, over the course of extended operation, the lubricant may be expelled from the bore and apertures due to motion of the parts. Additionally, the lubricant may become contaminated with particulates resulting in increased friction and possibly damaging the joint assembly. The lubrication may be replenished, but because of the location of the joint assembly, replenishment may be inconvenient and result in lost productivity for the machine due to maintenance downtime.

Therefore, in accordance with the disclosure, seals in the form of mechanical packings can be provided to protect and facilitate pivoting of the joint assembly. The spring seals can be configured for dry operation without the need for additional lubricants. Referring to FIG. 4, the seals can be disposed at the interfaces between the sleeve joint 146 and the firsts and second lugs 160, 162 of the frame joint 152. To provide the interface, the sleeve joint 146 can include a first bearing surface 172 and a second bearing surfaces 174 formed on opposite sides of the first end 140 of the lever arm 128. The first and second bearing surfaces may be generally planar or flat with the sleeve bore 148 disposed through opposing bearing surfaces. The first and second bearing surfaces 172, 174 may therefore define the sleeve height 149 of the sleeve joint 146. Similarly, the first lug 160 can have formed on its bottom surface a first lug face 176 that is planar or flat and through which the first aperture 164 is disposed. The second lug 162 likewise can have formed thereon its top surface a second lug face 178, located opposite of and directed toward the first lug face. The distance between the first lug face 176 and the second lug face 178 can accordingly provide the lug height 164

When the sleeve joint 146 is disposed between the first and second lugs 160, 162, the first bearing surface 172 faces toward and is generally adjacent to the first lug face 176 while the second bearing surface 174 likewise faces towards and is generally adjacent to the second lug face 178. To enable the adjacent bearing surfaces and lug faces to move with respect to each other, a first spring seal 180 is located between the first bearing surface 172 and the first lug face 176 while a second spring seal 182 is located between the second bearing surface 174 and second lug face 176. It will be appreciated that the first and second spring seals 180, 182 generally surround the pin 170 and can thereby prevent dirt and/or contaminants from penetrating along the interface between the bearing surfaces and lug faces. It will be further appreciated that the difference between the sleeve height 149 and the lug height 164 can be such that a first gap 184 and a second gap 186 can be formed between the sleeve joint 146 and the lugs 160, 162 and the first and second spring seals 180, 182 can be located in the gaps. By way of example only, the first gap 184 and the second gap 186 may be on the order of 6.35 millimeters (0.25 inches) in dimension. The first and second spring seals 180, 182 can be generally resilient and can be dimensioned to span the first and second gaps 184, 186 and urge against and contact the opposing bearing surfaces and lug faces. To provide the resilient characteristic, the first and second spring seals can be made from a suitable resilient material such as, for example, polyurethane.

To accommodate the first and second spring seals 180, 182 and facilitate functioning of the spring seals, a first groove 190 can be disposed into the first bearing surface 172 of the sleeve joint 146 and a corresponding second groove 192 can be disposed into the second bearing surface 174. The first and second grooves 190, 192 can be three-sided formations and can each include a respective wall corresponding to the groove bottoms 194, 196 that may be parallel to and spaced apart from the corresponding first and second bearing surfaces 172, 174. The distance between the groove bottoms 194, 196 and the corresponding first and second bearing surfaces 172, 174 thereby defines a groove depth 198, which may be the same or different between the first groove and second groove 190, 192. In an embodiment, the groove depth 198 can be on the order of 5.6 millimeters (0.22 inches). Although in the illustrated embodiment, the first and second grooves 190, 192 are disposed in the sleeve joint 146 of the lever arm 128, it will be appreciated that the grooves can be likewise formed in the first and second lugs 160, 162 in a reversal of orientation. Furthermore, the grooves may have different shapes than the illustrated three-walled construction.

Figure 6A:
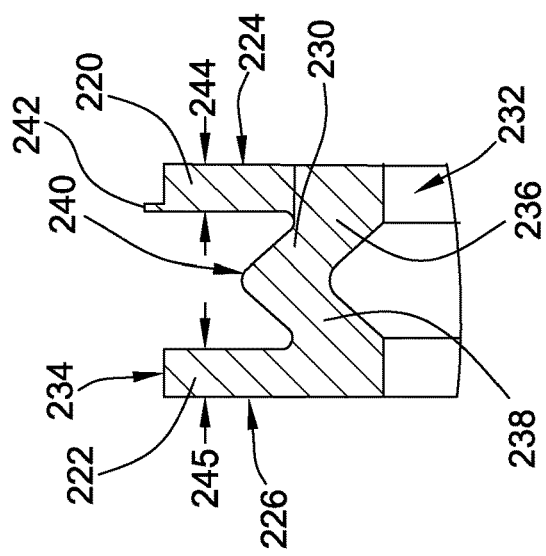
FIG. 6A is a detailed view of the W-shaped cross-section of the annular body including first and second cantilevered legs connected together by a spring leg.
Figure 6:
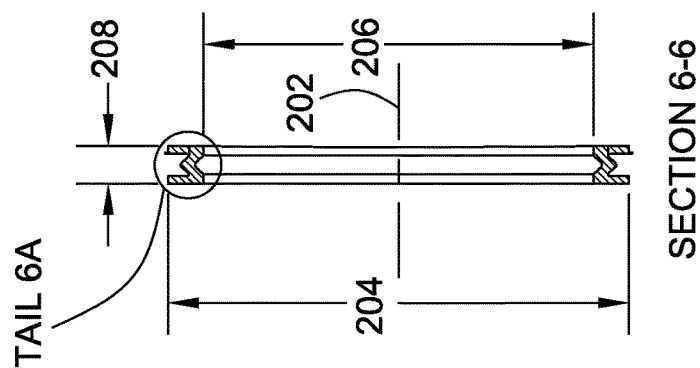
FIG. 6 is a cross-sectional view of the spring seal taken along lines 6-6 of FIG. 5.
Figure 5:
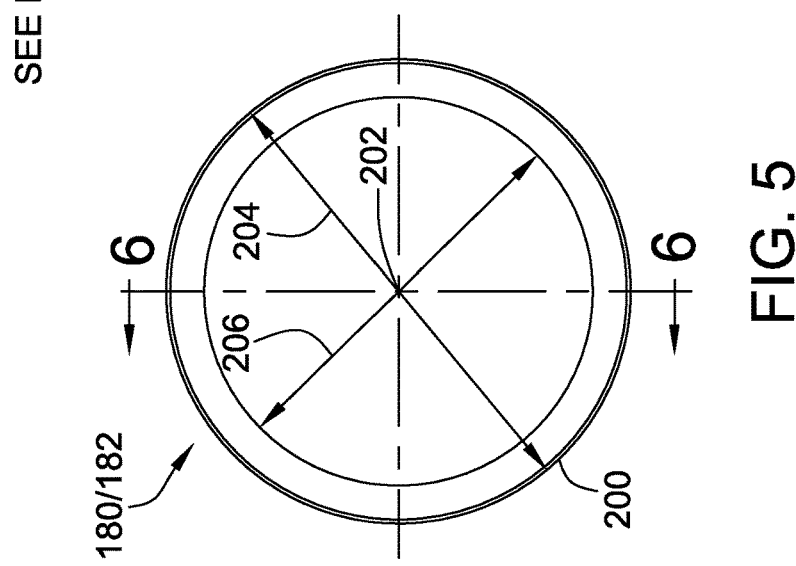
FIG. 5 is a top plan view of the spring seal illustrated in FIG. 4 that has an annular body extending radially around a pivot axis.

Referring to FIGS. 5 and 6, there is illustrated an embodiment of the first and second spring seals 180, 182. The first and second spring seals may be generally identical such that the following description may apply to both. The spring seals may have a generally annular body 200, circular in nature and circumscribing a center point or center axis 202, and may have an outer diameter 204 and an inner diameter 206 sufficient in dimension to circumscribe the pin of the joint assembly and extend within the interfaces between the bearing surfaces and the lug faces. By way of example, the outer diameter 204 of the annular body 200 may be approximately 111.6 millimeters (4.39 inches) and the inner diameter 206 may be approximately 94.6 millimeters (3.72 inches). Likewise, the annular body 200 may have a given height, measured in an uncompressed or relaxed state and parallel with respect to the center axis 202, referred to herein as the relaxed height 208 that is sufficient to project above the groove and span the gap between the bearing surfaces and the lug faces. Also by way of example, the relaxed height 208 in an embodiment may be approximately 8.9 millimeters (0.35 inches). To provide the resilient nature to the spring seals, the annular body 200 can be shaped to provide a compressible and resilient characteristic with respect to the relaxed height dimension 208 such that the annular body overall functions similar to a spring.

For example, in the embodiment illustrated in FIGS. 4 and 5, the annular body 200 can have a W-shaped or M-shaped cross section formed into the annular band 210 that makes up the annular body and that is oriented radially outward from the center point or center axis 202 of the annular body. The W-shaped cross section can include collapsible legs that enable the annular band 210 to collapse with respect to the relaxed height 208. In particular, to provide the W-shape, the annular band 210 includes a first cantilevered leg 220 and a second cantilevered leg 222 spaced apart and parallel to the first cantilevered leg. The first cantilevered leg 220 and the second cantilevered leg 222 are generally straight in shape and extend in a parallel manner radially outward from the center axis 202 of the annular body. To bear against either the bearing surfaces or lug faces of the joint assembly, the first circumferential leg 220 includes a first annular surface 224 oriented toward one axial side of the annular band 210 with respect to the center axis 202. The second circumferential leg 222 can include a second annular surface 226 oriented toward the axially opposite direction of the annular band 210 as the first annular surface 224. The first and second annular surfaces 224, 226 therefore define the relaxed height 208 of the annular body 200. The first and second annular surfaces 224, 226 are generally smooth, planar, and flat, and configured to abut against a similar configured surface.

To interconnect the first cantilevered leg 220 and the second cantilevered leg 222, the annular body 200 can include a spring leg 230 disposed between and joining the two cantilevered legs. In the illustrated embodiment, the spring leg 230 can be joined to the first and second cantilevered legs 220, 222 at an inner circumferential edge 232 of the annular band 210 that extends as a circle about the center axis 202. The inner circumferential edge 232 therefore corresponds to the inner diameter 206 of the annular body 200. The first and second cantilevered legs 220, 222 extend radially outward from the inner circumferential edge to a distally located outer circumferential edge 234 that corresponds to the outer diameter 204 and thus provides the cantilevered appearance to the cantilevered legs. The spring leg 230 can include a first sub-leg 236 that is joined to the first cantilevered leg 220 proximate the inner circumferential edge 232 and that extends outward toward the outer circumferential edge 234 at an inclined angle with respect to the first cantilevered leg. The spring leg 230 can also include a second sub-leg 238 joined to the second cantilevered leg 222 proximate the inner circumferential edge 226 and that extends outward toward the outer circumferential edge 234 at an inclined angle with respect to the first cantilevered leg.

Further, both the first and second sub-legs 236, 238 converge toward each other and intersect at a sub-leg intersection 240 that may have a radius or rounded peak. The sub-leg intersection 240 can be located axially midway between the first annular surface 224 and the second annular surface 226 and at a point radially between the inner circumferential edge 232 and the outer circumferential edge 234. The parallel arrangement of the first and second cantilevered legs 220, 222 and the inclined orientation of the first and second sub-legs 236, 238 of the spring leg 230 between the cantilevered legs provides the annular band 210 with the W-shaped cross section. As explained below, the first and second cantilevered legs 220, 222 and the sub-legs 236, 238 of the spring leg 230 can collapse and articulate with respect to each other to provide the resilient spring characteristic to the spring seals 180, 182.

In an embodiment, the annular body 200 making up the spring seals 180, 182 can include a peripheral lip 242 that extends radially from the outer circumferential edge 234 of the first cantilevered leg 220. The peripheral 242 lip can be substantially thinner than the thickness of the first cantilevered leg 220 and located on the side of the leg opposite the first annular surface 224. In an embodiment, the peripheral lip can extend 0.7 millimeters (0.027 inches) or less. The peripheral lip 242 may designate the first cantilevered leg 220 from the second cantilevered leg 222, which may have different shapes, thickness, or properties. For example, the first cantilevered leg 220 may have a thickness, designated by reference number 244, of about 1.78 millimeters (0.07 inches) while the second cantilevered leg 222 may have a thickness 245 of about 1.80 millimeters (0.078 inches). The different thicknesses may facilitate the sealing function of the spring seals.

Referring to FIG. 7, there is illustrated a schematic representation of how the first and second spring seals 180, 182 are arranged and operate in the joint assembly 150, as it may appear with the pin removed. In particular, the spring seals 180, 182 are arranged with the W-shaped cross section oriented radially outwards with respect to the pivot axis 156, although in other embodiments, this orientation can be reversed. The first spring seal 180 is accommodated in the first groove 190 disposed into the first bearing surface 172 of the sleeve joint 146 with the first cantilevered leg 220 projecting above the first groove toward the first lug 160 and the second cantilevered leg 222 parallel and adjacent to the groove bottom 194 of the first groove. In the embodiments where the spring seals include the peripheral tabs 242, the peripheral tabs may provide an indication about orienting the spring seal within the groove 190 such that the peripheral tab is above the groove and directed toward the first lug 160. This ensures that the thicker second cantilevered leg is disposed in the groove adjacent the groove bottom. The second spring seal 182 is similarly arranged in the second groove 192 disposed into the second bearing surface 174.

To maintain sealing contact as the lever arm pivots, a first thrust washer 250 can be located in the interface between the sleeve joint 146 and the first lug 160 and a second thrust washer 252 can be located at interface between the sleeve joint and the second lug 162. The thrust washers 250, 252 can be annular, disk shaped parts made from a low fiction material demonstrating a substantially low coefficient of friction with respect to the material of the lever arm and frame. Examples of low friction materials may include PTFE or a Teflon® composite materials. The first and second thrust washer 250, 252 are placed adjacent the respective first and second lugs 160, 162 and can be dimensioned to circumscribe the sleeve bore 148 disposed through the sleeve joint 146. When the lever arm is pivoted in the direction indicted by arrow 254, the first and second spring seals 180, 182 can be held in a fixed relation in the respective first and second grooves 190, 192 to rotate with the sleeve joint 146. The first and second thrust washers 250, 252 can be held in a fixed relation adjacent the first and second lugs 160, 162 so that the first cantilevered legs 220 of the spring seals slides along the surface of the thrust washers while maintaining sealing contact. The second cantilevered legs 222, which may be thicker than the first cantilevered legs 220, remain in frictional contact with the groove bottoms.

In the illustrated embodiment, the sleeve joint 146 may be spaced apart from the first lug 160 such that the first spring seal 180 is in a relaxed state with the first and second cantilevered arms 220, 222 separated by the expand spring leg 230. As indicated in Detail 7A, when the spring leg 230 is expanded, the first sub-leg 236 and the second sub-leg 238 are in their inclined and converging orientations. As mentioned above, the height of the spring seal 180 between the cantilevered legs 220, 222 should be sufficient to project across both the gap 184 between the first lug 160 and the first bearing surface 172 of the sleeve joint 146 and the groove depth 198 and preferably is such that the spring seal simultaneously urges against the first lug 160 and the groove bottom 194. This ensures the first spring seal maintains contact with both the sleeve joint and the first lug to seal the sleeve bore 148 that normally accommodates the pin and functions as the pivot point of the joint assembly.

In addition to sealing the sleeve bore 148, the first and second spring seals can cooperate to accommodate relative axial motion between the sleeve joint 146 and first and second lugs 160, 162 of the frame joint 152 with respect to the pivot axis 156. In particular, referring to the lower half of FIG. 7, the second spring seal 182 located in the second groove 192 disposed in the second bearing surface 174 can be in a compressed state as may occur if the sleeve joint 146 and the second lug 162 axially move toward each other. In this case, the gap 184 between the bearing face and lug shrinks and the second spring seal 182 is collapsed into the second groove 192. When the second spring seal 182 collapses, the first cantilevered leg oriented toward the second lug 162, the parallel second cantilevered leg 222 adjacent the groove bottom 196, and the spring leg 230 move adjacent to each other, as indicated in Detail 7B. In particular, the first sub-leg 236 and the second sub-leg 238 articulate or flex with respect to the sub-leg intersection 240 from their normal inclined arrangement to press against each other as the first cantilevered leg 220 and the second cantilevered leg 222 move toward each other. The resilient material of the spring seal facilities this collapse. In addition, the resiliency causes the second spring seal 182 to urge back against the second lug 160 and the groove bottom 196 of the second groove 192 further ensuing that the sleeve bore 148 is effectively sealed. In embodiments including the thrust washers, the low friction material of the thrust washer may permit continued pivoting in the event the sleeve joint and the lugs of the frame joint bottom out against each other.

The resilient characteristic of the first and second spring seals 180, 182 further facilitates reciprocal motion of the sleeve joint 146 between the first and second lugs 160, 162 along the axial direction delineated by the pivot axis 156. In particular, if the sleeve joint 146 moves axially toward the first lug 160, the resiliency enables the first spring seal 180 to collapse into the first groove with the first and second cantilevered legs 220, 222 and spring leg 230 compressed together so that the first spring seal 180 appears as in Detail 7B. To promote sealing by filling the groove, the peripheral tab 242 can be pulled into the groove and folds over the distal end of the first cantilevered leg 220. Likewise, the second spring seal 182 resiliently expands back to the relaxed state with the expanded W-shaped cross section while maintaining sealing contact between the groove bottom 196 of the second groove 192 and the second lug 162, as would be indicated by Detail 7A.

Figure 9:
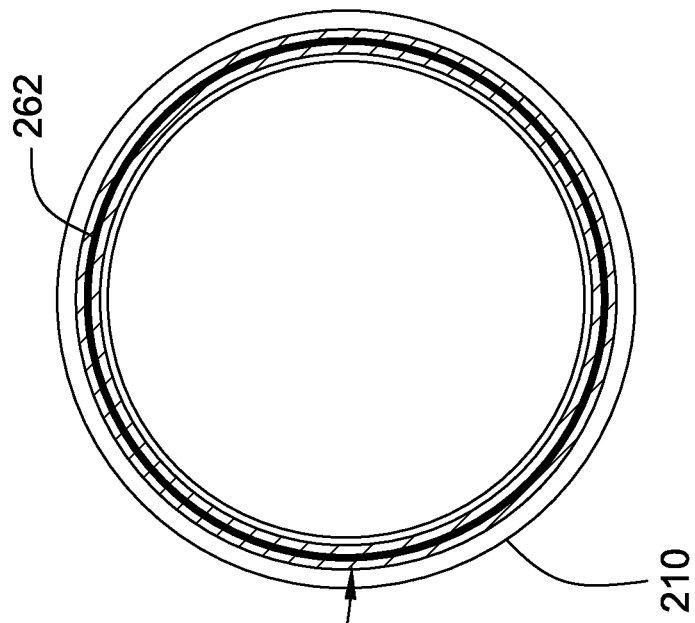
FIG. 9 is a schematic representation of the top plan view of the spring seal indicating the minimum contact pressure exerted on the spring seal when disposed in the joint assembly.
Figure 8:
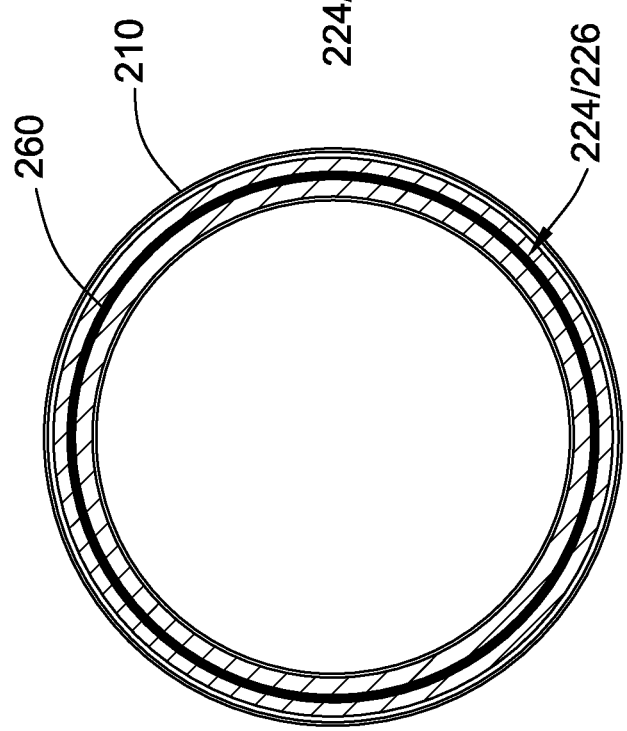
FIG. 8 is a schematic representation of the top plan view of the spring seal indicating the maximum contact pressure exerted on the seal when disposed in the joint assembly.

As indicated schematically in FIGS. 8 and 9, these alternating states of compression and relaxation results in the annular body 200 of the first spring seal and second spring seal being alternative states of maximum compression and minimum compression. Referring to FIG. 8, when under maximum compression, substantially the entire first and second annular surfaces 224, 226 of the annular body 200 exert a maximum contact pressure indicated by the lighter and darker shading 260 against the respective components of the joint assembly. Accordingly, the maximum contact pressure 260 extends substantially across the entire width of the first and second annular surfaces 224, 226. The maximum contact pressure 260 also extends circumferentially around the entire annular surface 224, 226 of the annular body. When under minimum compression, illustrated in FIG. 9, the first and second annular surfaces 224, 226 exert a minimum contact pressure indicated by shading 262 that extends as a narrower band across the width of the annular surfaces. To ensure adequate sealing of the joint assembly, the band of minimum contact pressure 262 can also continue completely around the circumference delineated by the annular body 200. Accordingly, the first and second spring seals work in conjunction, alternating compressed and relax states, to maintain the seal about sleeve bore.

INDUSTRIAL APPLICABILITY

The present disclosure is applicable to sealing a joint assembly that pivots a lever arm such as a pitman arm used in the steering assembly of a machine. The joint assembly according to the disclosure results in a substantially maintenance free joint for a pivoting lever arm. Referring to FIGS. 4 and 7, to seal the joint assembly 150, which may be a pin joint or a revolute joint, first and second resilient spring seals 180, 182 can be located at the interfaces between a sleeve joint 146 of the pivoting lever arm 128 and a stationary frame joint 152 to which it is joined. In particular, the sleeve joint 146 is disposed between an upper first lug 160 and a lower second lug 162 that are connected to the frame 106 of the machine. Further, the first and second spring seals 180, 182 extend circumferentially around a pin 170 accommodated in the sleeve bore 148 of the sleeve joint 146. Accordingly, the spring seals prevent the ingress of dirt and contaminants across the interfaces and protect the internal components of the joint assembly.

To accommodate axial motion of the sleeve joint 146 with respect to the frame joint 152, the first and second spring seals 180, 182 can be formed with W-shaped cross sections allowing them to compress and relax in a manner changing the seal height. Referring to FIG. 7 for example, if the sleeve joint 146 moves away from the upper first lug 160, increasing the space therebetween, the W-shaped cross section of the first spring seal 180 can expand to maintain sealing contact between the parallel first and second cantilevered legs 220, 222 of the seal and the respective components of the joint assembly. Likewise, as the sleeve joint 146 moves axially toward the lower second lug 162 decreasing the space therebetween, the W-shaped cross section of the second spring seal 182 collapses allowing the parallel first and second cantilevered arms 220, 222 to move together. Accordingly, the compressed and relaxed states maintain the seal about the pin 170 that delineates the pivot axis 156 of the joint assembly 150 even during axial motion of the pivoting and stationary components of the joint assembly.

To enable the sleeve joint 146 to pivot, the W-shaped spring seals 180, 182 are partially retained in a groove disposed in, for example, the sleeve joint with the first cantilevered leg 220 projecting above the groove and the second cantilevered leg 222 bearing against the groove bottom. In addition, thrust washers 250, 252 of a low friction material can be located at the interfaces and arranged to contact the projecting first cantilevered leg 220. When the sleeve joint 146 pivots, the spring seals 180, 182 rotate with the sleeve joint due to frictional contact with the groove and maintains sliding contact with the thrust washers 250, 252. The foregoing arrangement has been found to facilitate +/−50 degrees of pivotal rotation of the lever arm with respect to the frame joint. Further, frictionless sliding motion between rigid components and resilient seal materials can eliminate the need for lubricants and reduce downtime for maintenance.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A joint assembly for a steering assembly comprising:
  a frame of a machine, the frame including a monolithic frame joint having a first lug fixed to the frame and defining a first aperture and a second lug fixed to the frame and defining a second aperture, the first lug and the second lug spaced apart to define a minimum lug height and arranged with the first aperture and the second aperture axially aligned along a pivot axis;
  a pitman arm having a first end and a distal second end operatively connected to a linkage of the steering system and delineating an extension of the pitman arm, the first end including a sleeve joint defining a sleeve bore transverse to the extension, wherein the sleeve joint has a maximum sleeve height less than the minimum lug height and is received between the first lug to provide a first gap and the second lug to provide a second gap with the sleeve bore axially aligned with the first aperture and the second aperture along the pivot axis, the first and second gaps provided by a difference between the minimum lug height and the maximum sleeve height allowing axial motion between the sleeve joint and the first and second lugs;
  a pin disposed through the first aperture, the second aperture, and the sleeve bore pivotally joining the pitman arm to the first lug and the second lug;

a first spring seal and a second spring seal each including an annular body having a W-shaped cross section with a first cantilevered leg, a second cantilevered leg spaced apart and parallel to the first cantilevered leg, and a spring leg joined to and connecting the first cantilevered leg and the second cantilevered leg; wherein the first spring seal disposed between the sleeve joint and the first lug and circumscribing the sleeve bore; and the second spring seal disposed between the sleeve joint and the second lug and circumscribing the sleeve bore.

2. The joint assembly of claim 1, wherein the spring leg is configured to resiliently urge the first cantilevered leg and the second cantilevered leg apart from each other.

3. The joint assembly of claim 2, wherein the spring leg includes a first sub-leg joined to and extending inclined from the first cantilevered leg, the spring leg further including a second sub-leg joined to and extending inclined from the second cantilevered leg, the first sub-leg and the second sub-leg converging together at a sub-leg intersection.

4. The joint assembly of claim 3, wherein the first spring seal and the second spring seal are configured to collapse the first cantilevered leg and the second cantilevered leg together by flexing the first sub-leg and second sub-leg together.

5. The joint assembly of claim 1, wherein the first cantilevered leg of the first and second spring seals includes a first annular surface and the second cantilevered leg of the first and second spring seals includes a second annular surface.

6. The joint assembly of claim 5, wherein the first spring seal and the second spring seal has a relaxed height between the first annular surface and the second annular surface.

7. The joint assembly of claim 6, wherein the sleeve joint includes a first groove arranged to circumscribe the sleeve bore, the first groove having a groove depth.

8. The joint assembly of claim 7, wherein the relaxed height of the first spring seal and the second spring seal is greater than the groove depth such that the first cantilevered leg projects above the first groove.

9. The joint assembly of claim 1, further comprising a first thrust washer disposed between the sleeve joint and the first lug and a second thrust washer disposed between a sleeve joint and the second lug, wherein the first spring seal is arranged so its first cantilevered leg contacts the first thrust washer, and the second spring seal is arranged so its cantilevered leg contacts the second thrust washer.

10. The joint assembly of claim 9, wherein the first thrust washer and the second thrust washer are made of a low friction material.

11. The joint assembly of claim 10, wherein the sleeve joint includes a first groove and a second groove, the first spring seal partially accommodated in the first groove and the second spring seal partially accommodated in the second groove.

12. The joint assembly of claim 11, wherein the second cantilevered leg of the first spring seal and the second spring seal are in frictional contact with a first groove bottom of the first groove and a second groove bottom of the second groove respectively.

13. A method of pivotally connecting a pitman arm of a steering assembly having a first end and a distal second end operatively connected to a linkage of the steering assembly and delineating an extension of the pitman arm to a frame of a machine comprising:

providing a monolithic frame joint attached to a frame of a machine, the monolithic frame joint including a first lug fixed to the frame and defining a first aperture and a second lug fixed to the frame and defining a second aperture, the first lug and the second lug spaced apart to define a minimum lug height and arranged so the first aperture and second aperture are aligned along a pivot axis;

disposing a sleeve joint included at the first end of the pitman arm between the first lug and the second lug such that a sleeve bore disposed in the sleeve joint is aligned with the pivot axis;

the sleeve joint including a first bearing surface and a second bearing surface defining a maximum sleeve height less than the minimum lug height;

providing a first spring seal having an annular body with a W-shaped cross-section between the first bearing surface of the sleeve joint and the first lug, the first spring seal circumscribing the sleeve bore; and providing a second spring seal having an annular body with a W-shaped cross-section between the second bearing surface of the sleeve joint and the second lug, the second spring seal circumscribing the sleeve bore;

compressing first spring seal by axially moving the sleeve joint toward the first lug; and relaxing the second spring seal to maintain sealing contact between the second bearing surface and the second lug.

14. The method of claim 13, wherein the first spring seal and the second spring seal each includes a first cantilevered leg, a spaced apart second cantilevered leg, and a spring leg disposed between and joining the first cantilevered leg and the second cantilevered leg.

15. The method of claim 14, further comprising:

accommodating the first spring seal in a first groove disposed into the sleeve joint with second cantilevered leg in frictional contact with a first groove bottom; and accommodating the second spring seal in a second groove disposed into the sleeve joint with the second cantilevered leg in frictional contact with a second groove bottom.

16. A joint assembly for a steering system comprising:

a frame of a machine, the frame including a monolithic frame joint having a first lug fixed to the frame and defining a first aperture and a second lug fixed to the frame and defining a second aperture, the first lug having a first lug face and the second lug having a second lug face in spaced apart relation such that the first aperture and the second aperture are axially aligned along a pivot axis and the first lug face and the second lug face are located opposite of and directed towards each other;

a pitman arm having a first end and a distal second end connected to a linkage of the steering system and delineating an extension of the pitman arm, the first end including a sleeve joint having a first bearing surface and a second bearing surface formed on opposite side of the first bearing surface, the sleeve joint defining a sleeve bore disposed through the first and second bearing surfaces and transverse to the extension, the sleeve joint being received between the first lug and the second lug with the sleeve bore axially aligned with the first aperture and the second aperture along the pivot axis;

a pin disposed through the first aperture, the second aperture, and the sleeve bore pivotally joining the pitman arm to the first lug and the second lug;

first spring seal and a second spring seal each including an annular body having a W-shaped cross section with a first cantilevered leg, a second cantilevered leg spaced apart and parallel to the first cantilevered leg, and a spring leg joined to and connecting the first cantilevered leg and the second cantilevered leg; wherein the first spring seal is accommodated in a first three-sided annular groove formed in one of the first lug face and the first bearing surface to circumscribe the sleeve bore, the first spring seal forming an axial seal between the first lug and the sleeve joint and the first three-sided annular groove having an inner diameter blocking radial contact between the first spring seal and the pin; and the second spring seal is accommodated in a second three-sided annular groove formed in one of the second lug face and the second bearing surface to circumscribe the sleeve bore, the second spring seal forming an axial seal between the second lug and the sleeve joint and the second three-sided annular groove having an inner diameter blocking radial contact between the second spring seal and the pin.

17. The joint assembly of claim 16, wherein the first annular groove and the second annular groove each have a groove depth, and the first spring seal and the second spring seal each have a related height that is greater than the groove depth.

18. The joint assembly of claim 16, wherein the first lug face and the second lug face are spaced apart to define a lug height, and the sleeve joint defines a sleeve height less than the lug height to provide a first gap and a second gap allowing axial motion between the sleeve joint and the first and second lug faces.

19. The joint assembly of claim 18, further comprising a first thrust washer disposed in the first gap and superposed across the first annular groove and a second thrust washer disposed in the second gap and superposed across the second annular groove.

20. The joint assembly of claim 16, wherein:
the first spring seal contacts all sides of the first annular three-sided groove when compressed therein by relative axial motion between the first lug and the sleeve joint; and
the second spring seal contacts all sides of the second annular three-sided groove when compressed therein by relative axial motion between the second lug and the sleeve joint.

* * * * *